March 22, 1966 P. J. WAZNYS 3,242,454

POTENTIOMETER TERMINALS AND CONNECTIONS THERETO

Filed Oct. 11, 1963

INVENTOR.
PETER WAZNYS

BY

Leonard H. King

ATTORNEY 3,242,454
POTENTIOMETER TERMINALS AND CONNECTIONS THERETO
Peter Joseph Waznys, 94—15 109th St., Richmond Hill, N.Y.
Filed Oct. 11, 1963, Ser. No. 315,439
2 Claims. (Cl. 338—322)

This invention relates to means for connecting internal elements of a potentiometer to externally positioned stand-off terminals. More particularly, the invention is directed towards an improved method of assembling a potentiometer using a large diameter wire.

Potentiometers, either single or ganged, having a plurality of terminals, are well known in the art and are adapted to a variety of electronic systems. Devices such as computers, navigational aids, etc., require the conversion of a rotating shaft's angular position into readable electric signals. Potentiometers are well suited to this purpose and may be so employed either singly or in a gang. In the case of ganged potentiometers, a single, coaxial shaft is used, extending longitudinally through the several externally coupled units. Provided within the housing of each individual unit is a fixed support member, a resistance element suitably secured to the support member, rotatable take-off and wiper means, and a plurality of terminals. Still other terminals, extending radially through the wall of each housing are adapted for electrical connections both internally and externally.

Past methods of making electrical connections between the internal terminals and the external terminals extending radially from the housing have been particularly vexing, representing long standing problems in the industry. In extremely small potentiometers, commonly used where weight and size are a factor, the internal area available for the manipulation of assembly tools is quite confined. At the same time, the stringent requirements for ruggedness, accuracy and reliability are retained and may, in fact, be increased, depending upon the application of the potentiometer. Adding to the problem is the fact that the components involved are both delicate and costly. The difficulties inherent in assembling components of this nature make it imperative to improve the technique wherever possible.

The present invention is directed towards this end by providing improved connecting means in potentiometers of extremely small size. A short, hooked wire, of relatively large diameter, compared to the prior art, is positioned about, and soldered to the appropriate internal terminal. The other, straight end of the wire is passed outwardly through an aperture in the casing wall. A hollow, stand-off terminal is slipped over the wire after having had an epoxy cement applied to that part of the terminal which will extend through the casing wall. With the terminal inserted in the casing wall, the free end of the wire is pulled outwardly and the terminal is crimped thereabout. Subsequently, the wire and the terminal are soldered together to assure maximum electrical continuity. It has been found that a copper wire of about 0.028″ to 0.040″ diameter, representing an increase of about four times the diameter of the conventionally employed prior art wire may be employed.

Heretofore, an extremely fine wire, approximately 0.008″ diameter, was used to interconnect internal and external terminals. Handling of this wire required great dexterity as it was quite fragile. Only limited amounts of tension could be applied to the wire, it being so delicate that handling by tools such as tweezers was required. In contrast, the present invention permits the use of conventional tools such as pliers by assemblers of considerably less skill.

It is therefore an object of this invention to provide improved connection means between internal and external terminals of a potentiometer.

Another object is to provide an improved external terminal for a potentiometer of small size.

Still another objective is to provide a novel, hollow terminal for radial mounting on the exterior of the potentiometer housing.

An additional object is to provide improved terminal and terminal connecting means consistent in size with small potentiometers and yet adaptable to assembly by conventional techniques.

Still another object is to provide improved terminal and terminal connection means of small size that are convenient to assemble at a low cost.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figures 1, 2, 3, 4, 5:
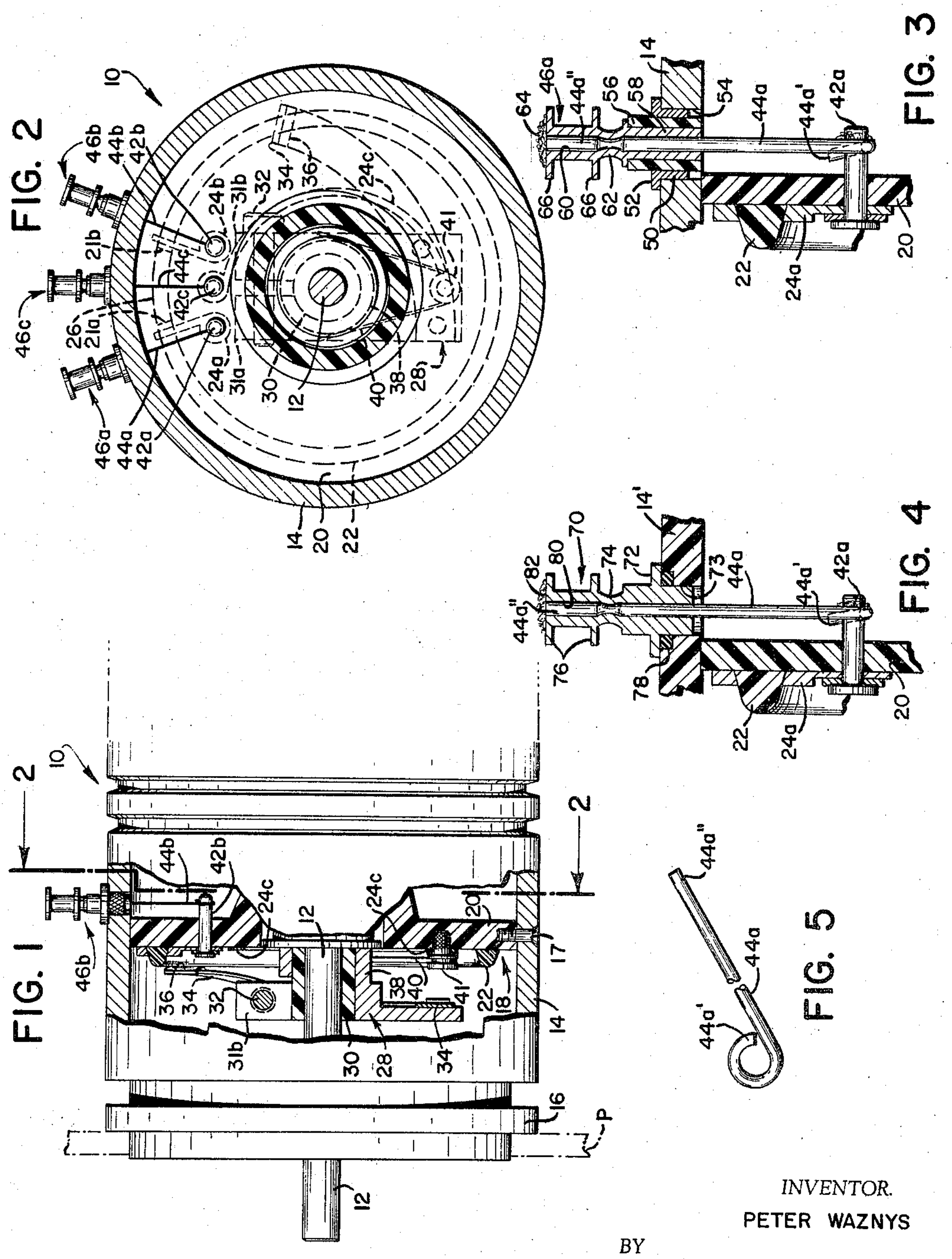
FIG. 1 is a side elevation partly in section of a potentiometer assembly incorporating the present invention.
FIG. 2 is an end elevation taken along line 2—2 of FIG. 1.
FIG. 3 is an enlarged detail of an external terminal and associated connective means employed in a potentiometer having a conductive housing.
FIG. 4 is an enlarged detail of an alternative embodiment of the present invention employed in a potentiometer having a housing made of an electrically nonconductive material.
FIG. 5 is a perspective showing of connecting means used in the present invention.

In FIGS. 1 and 2, there is shown a conventional potentiometer 10 employing radial terminals and novel connective means of the present invention. Several individual potentiometers are shown in a ganged configuration but it should be understood that the invention is equally adaptable to a single unit and will be so described. Shaft 12 is coaxial and concentric with cylindrical housing 14 and suitably journaled therein for rotation by means of bearings. Servo flange 16 represents one typical means for mounting potentiometer 10 to panel P. Mounted transversely within housing 14, as by screws 17, is a resistance element 18 comprising a disc-shaped insulating base member 20, and a comolded conductive resistance track 22 coaxial and concentric with shaft 12.

Conductive paths **24*a* and 24*b* are affixed to base member 20 and contact the resistance track 22 proximate the ends thereof. The short remaining arc 26 between track ends 21*a* and 21*b*** is filled with an insulator plastic to electrically isolate the terminals and also to provide a continuous 360° track.

Rigidly attached to shaft 12 is a brush block 28, insulated therefrom by means of nonconductive sleeve 30. Two spaced legs, **31*a* and 31*b*, are formed on brush block 28 and are adapted to receive clamp screw 32. Thus, rotation of shaft 12 will cause rotation of brush block 28 which carries spring member 34. Precious metal contact 36, secured to the free end of spring member 34, is adapted to slidably traverse track 22 and in so doing vary the output voltage of the potentiometer corresponding to the angular displacement of shaft 12. Additionally, there is integrally formed on brush block 28 a hub portion 38, concentric and rotatable with shaft 12. Hairspring wiper 40, secured to post 41 mounted in base member 20, is located such that its spaced legs ride on the rotating outer surface of hub portion 38**.

Only the conventional internal components of a potentiometer have thus far been described. The improved potentiometer of the present invention also includes studs 42*a*, 42*b* and 42*c*, secured, respectively, to conductive paths 24*a*, 24*b* and 24*c*. These studs, extending longitudinally through base member 20, have soldered thereto one end of conductive lead wires 44*a*, 44*b* and 44*c*. The opposite end of each lead wire is secured respectively within hollow terminals 46*a*, 46*b*, and 46*c*, said terminals being radially affixed to housing 14 and extending therethrough. Conductive path 24*c* electrically connects terminal 46*c* with hairspring wiper 40 by means of post 41. A complete electrical circuit, responsive to the angular displacement of shaft 12 has now been completed.

There is shown in greater detail in FIG. 3 a hollow terminal 46*a* suitable for use with a housing constructed of metal, such as aluminum. The terminal comprises, in part, an outer tubular member 50 made of a conductive material such as brass having a flange 52 adapted to seat against the outside surface of housing 14. Tubular member 50 is knurled and is intended to be driven into aperture 54 in housing 14, said aperture being sized for an interference fit. An insulating sleeve 56, encased within tubular member 50, encloses an electrically isolates electrically conductive inner tubular member 58 from metal housing 14. During the assembly of the potentiometer, hooked end 44*a'* of lead wire 44*a* is looped around stud 42*a* and soldered in place. The opposite straight end 44*a''* of lead wire 44*a* is passed through aperture 54 in the housing wall 14. Terminal 46*a* is threaded over straight end 44*a''* of wire 44*a* and the tubular portion 50 is press fit into aperture 54. Tension is simultaneously applied to wire 44*a* by pulling it from the outside and the inner tubular member 58 is crimped at neck portion 62 to capture lead wire 44*a*. Excess wire is removed and solder applied at end 64 to assure a good electrical connection. Flanges 66 define an area for application of additional lead wires from the terminal to the utilization device.

FIG. 4 is an enlarged showing of an alternative embodiment of the terminal and connective means applicable where non-conductive housings are used. Hollow terminal 70 is provided with a flange 72, adapted to seat against the outer surface of non-conductive housing 14', a neck portion 74, dimensioned such that it may be crimped about the wire passed therethrough, and flanges 76 defining an area for affixing additional lead wires from the utilization device. Gasket 78 and a suitable epoxy resin form an enviromental seal about the terminal. As in the previous embodiment the hooked end of the wire is placed about the stud, then soldered thereto. The straight end of the lead wire is passed through aperture 73 of housing wall 14'. The terminal is then threaded over the wire and secured to the housing, tension being applied to the wire by pulling from the outside at the same time. The terminal is crimped at neck portion 74 to mechanically secure it to the lead wire. In order to achieve maximum electrical contact after crimping, the assembly is soldered at end 82.

It should be particularly noted that the connective lead wire for a stud, such as 42*c*, may be secured, as shown in FIG. 2, by a suitable epoxy resin prior to the application of external tension and crimping. It should be further noted that, except at both ends, lead wires 44 may have a protective insulating cover which has been omitted in the drawings for clarity.

Thus, there have been provided novel terminal interconnecting means and method for the assembly thereof for both metallic and non-metallic potentiometer housings. The use of relatively large diameter, internal connective means facilitates the assembly of small potentiometers having only confined areas in which to work. As a result, the chance of damaging costly components during assembly is greatly diminished and the cost of the unit reduced.

There has been disclosed heretofore the best embodiment of the invention presently contemplated and it is to be understood that various changes and modifications may be made by those skilled in the art without departing from the spirit of the invention.

What is claimed is:

1. Improved feed-through terminal connection means for an electrical device contained within a walled housing comprising:

a deformable tubular metal terminal extending into the housing and secured thereto;

a conductive stud electrically connected to the electrical device; and a large diameter, relatively stiff lead wire having a straight end portion and hooked portion, said straight portion passing through said tubular metal terminal and secured therein against movement by an inwardly extending crimp in said tubular metal terminal engaging said lead wire, and said hooked end secured to said conductive stud.

2. In a potentiometer having an apertured housing, a support member mounted within the housing and a resistance element carried by the support, that improvement therein which comprises:

(a) stud means carried by said support member, said stud means being in electrical connection with said resistance element;

(b) a large diameter, relatively stiff lead wire having a hooked end portion looped about a free end of said stud means and electrically and mechanically secured thereto, and a straight portion passing through said aperture in said housing;

(c) metallic terminal means provided with an axial bore, said terminal means being secured in said aperture of said housing and having the said straight portion of said lead wire extending through the bore of said terminal means; and (d) a deformed terminal means portion engaging said straight portion of said lead wire so as to prevent movement thereof.

References Cited by the Examiner

UNITED STATES PATENTS

| | | | |
|---|---|---|---|
| 2,326,090 | 8/1943 | Yadon | 339—271 |
| 2,419,952 | 5/1947 | Komicek | 29—155.62 |
| 2,778,906 | 1/1957 | Burgess | 338—174 |
| 2,782,288 | 2/1957 | Weld | 338—174 |
| 2,873,509 | 2/1959 | Sorber | 29—155.62 |
| 2,884,506 | 4/1959 | Graustein | 338—175 |
| 2,889,529 | 6/1959 | Vacha | 338—174 X |
| 2,937,356 | 5/1960 | Louis | 338—164 |
| 3,122,406 | 2/1964 | Modrey | 339—271 X |
| 3,134,084 | 5/1964 | Shriro | 338—174 X |
| 3,184,697 | 5/1965 | Sargent | 338—175 |

RICHARD M. WOOD, *Primary Examiner.*

ANTHONY BARTIS, *Acting Examiner.*

V. Y. MAYEWSKY, *Assistant Examiner.*